United States Patent [19]

Schabert

[11] 4,277,309

[45] Jul. 7, 1981

[54] NUCLEAR REACTOR INSTALLATION

[75] Inventor: Hans-Peter Schabert, Erlangen, Fed. Rep. of Germany

[73] Assignee: Kraftwerk Union Aktiengesellschaft, Mülheim, Fed. Rep. of Germany

[21] Appl. No.: 820,257

[22] Filed: Jul. 29, 1977

[30] Foreign Application Priority Data

Jul. 30, 1976 [DE] Fed. Rep. of Germany ....... 2634294

[51] Int. Cl.² .............................................. G21C 19/20
[52] U.S. Cl. ......................................... 176/37; 176/38
[58] Field of Search ............... 176/37, 38, 87, DIG. 2; 61/0.5, 11, 12, 13; 52/169.6

[56] References Cited

U.S. PATENT DOCUMENTS

| 2,346,196 | 4/1944 | Starret | 52/169.6 |
|---|---|---|---|
| 3,021,273 | 2/1962 | Dix | 176/38 |
| 3,096,902 | 7/1963 | Schroeder | 61/0.5 |
| 3,232,843 | 2/1966 | Went et al. | 176/38 |
| 3,438,857 | 4/1969 | Sulzer | 176/38 |
| 3,444,725 | 5/1969 | Chave | 176/38 |
| 3,712,851 | 1/1973 | Isberg et al. | 176/38 |
| 3,763,652 | 10/1973 | Rinta | 61/0.5 |

FOREIGN PATENT DOCUMENTS 803569 2/1958 United Kingdom .................... 176/37

OTHER PUBLICATIONS

Geneva Conference on Atomic Energy 2nd-vol. 11, by Carlbom et al., pp. 101-106.

Primary Examiner—S. A. Cangialosi
Attorney, Agent, or Firm—Herbert L. Lerner

[57] ABSTRACT

Nuclear reactor installation having a tight concrete tank sunk at least in part into earth formed with a groundwater-permeable layer and a largely impermeable layer providing a lower boundary for the groundwater-permeable layer, includes a wall disposed in the earth and surrounding the concrete tank, the wall extending down through the groundwater-permeable layer at least to the impermeable layer, and means including a pump and a filter for separating activity carriers for connecting the part of the groundwater-permeable layer enclosed by the wall with the part of the groundwater-permeable layer located outside the wall.

14 Claims, 5 Drawing Figures

NUCLEAR REACTOR INSTALLATION

The invention relates to a nuclear reactor installation with a tight concrete tank which is sunk at least partly into earth formed with a groundwater-permeable layer and a largely impermeable layer providing a lower boundary for the groundwater-permeable layer. The concrete tank may be the reactor building of a nuclear power plant, since the invention relates, more particularly, to the so-called hill type construction of nuclear power plant installations such as is described in the journal "Atomwirtschaft" July/August, 1975, pages 364 and 365. The concrete tank or container may, however, also enclose a factory for the reprocessing of spent fuel elements or only a storage for the latter as well as nuclear engineering laboratories or the like.

Although it was mentioned in the aforecited journal that a detrimental effect upon the groundwater can be avoided, it has been left open as to how this can be achieved in detail. It is accordingly an object of the invention of the instant application to provide an advantageous solution for the foregoing problem.

With the foregoing and other objects in view, there is provided, in accordance with the invention, a nuclear reactor installation having a tight concrete tank sunk at least in part into earth formed with a groundwater-permeable layer and a largely impermeable layer providing a lower boundary for the groundwater-permeable layer, comprising a wall disposed in the earth and surrounding the concrete tank, the wall extending down through the groundwater-permeable layer at least to the impermeable layer, and means including a pump and a filter for separating activity carriers for connecting the part of the groundwater-permeable layer enclosed by the wall with the part of the groundwater-permeable layer located outside the wall.

Should there be several groundwater-permeable and impermeable layers superimposed one on the other in the earth, the water-impermeable layer is preferably understood to be the uppermost layer that is not breached by the foundation of the concrete container.

Under the aforementioned condition, what is achieved by the invention is that a lower water table prevails in the space enclosed by the wall than that outside the wall. Therefore, a groundwater flow, to the extent that it can be produced at all due to leaks in the wall or the layer, will occur only from the space outside the wall into the interior, so that radioactivity which could hypothetically have escaped from the concrete tank after an accident, cannot be entrained by the groundwater to the outside. The expense required therefore is relatively low and certainly not higher than if one would consider the cost of attaining a complete enclosure by means of an absolutely impermeable wall of the reactor building. In addition, the containment of the radioactivity achieved with the invention remains effective even if one considers that, under the worst assumptions, an accident involving core meltdown could occur, in which case the molten core would penetrate into the earth through the reactor building. The region enclosed by the wall thus forms a so-called "core catcher".

With the invention, the pumps need be set into operation only if there is danger at all that radioactive groundwater might escape from the space enclosed by the wall. This means, therefore, that in normal operation, when the concrete tank, as an at least single-shell enclosure of the radioactivity-carrying parts, is supposed to be tight, the pumps do not operate at all. It is also conceivable, of course, to maintain beforehand, in normal operation, a given difference between the groundwater tables inside and outside the wall. In addition, the operation of the pumps can be made dependent on the condition that the radioactivity of the pumped groundwater does not exceed certain limits, because the capacity of the filters will not be made arbitrarily large for reasons of economy. In this case, one would therefore not generate an artificial groundwater flow out of the annular space, but would confine oneself to the retarding or restraining capability of the wall, even though it may be limited.

In accordance with another feature of the invention, the nuclear reactor installation includes another wall concentric with and spaced from the first-mentioned wall and defining therewith an annular space to which the pump is connected.

The water table inside the inner one of the two walls is lowered, in fact, by the pumping, the inner wall ensuring, simultaneously, that a difference in the activity levels can develop, which is advantageous for the construction of the filters. Since there is no groundwater-differential pressure at this inner wall in this case, the removal of radioactivity through this wall is especially small.

As stated hereinbefore at the introduction hereto, the invention is of special interest for installations of the hill-type construction with which, by means of the hill, the escape of radioactivity into the environment is largely or completely prevented. For this case, in accordance with the invention, the wall is constructed so that the hill extends over the wall. Thereby, on the one hand, damage to the wall at some point, for example, through external effects, can be avoided while, on the other hand, assurance is provided that radioactive gases and vapors which may be generated under some circumstances, can penetrate into the region of the hill only, which is better suited for intercepting them than the normal surface of the earth.

Within the hill, in accordance with the invention, the wall extends up to the original surface level of the earth, unless it is even continued beyond that level, for example, in such a way that the hill forms, so-to-speak, a cover for the region enclosed by the wall. Thus, in accordance with a further feature of the invention, the hill is formed of strata of material of varying permeability in the shape of a single- or double-walled bell enclosing the reactor building or concrete tank. The strata are bounded by sheets of plastic, in accordance with yet another feature of the invention, in order to obtain absolute liquid-tighness and extensive gas-tightness. Clay strata, which have the advantage over plastic inserts in that they are self-healing and temperature-stable, may be considered to be liquid-tight.

In accordance with an additional feature of the invention, the wall is advantageously formed of bentonite. This is a natural mineral which is filled in powder form with water into predetermined excavations which determine the shape of the wall. Such excavations which determine the shape and location of the wall may not only extend up to the surface of hereinaforementioned uppermost, water-impermeable layer, but also into the latter.

The strata of varying permeability of the hill, which adjoin the regions separated by the wall in the original earth level, permit a gas-tight enclosure under some circumstances, by means of which gaseous contaminants can also be suppressed. For this purpose, a suction system similar to that for the groundwater can be provided in order to maintain an underpressure. It may be advantageous, in such a case, to solidify the border areas of the denser material when the hill is built in order to improve the tightness thereof. This tightness can be protected by paving and solidifying the surface of the hill over a layer of clay by means of slabs of concrete or rocks.

In accordance with an added feature of the invention, the volume of the hill which is in communication with the interior of the wall is subdivided by partitions into at least two zones. One can thereby create various possibilities for effecting pressure relief which help, in particular, to prevent destruction of the concrete tank, as will be explained hereinafter in greater detail. Such partitions are made water-tight and largely gas-tight by means of clay. As explained hereinbefore, and further in accordance with the invention, both zones are connected with the part of the earth which is enclosed by the wall, so that activity carriers which are rinsed or flushed, for example, by rain water downwardly from the two zones, are reliably intercepted by the part enclosed by the wall and do not penetrate into the general groundwater. In this connection, and in accordance with yet a further feature of the invention, separate pumps are provided which pump leakage or rain water from the inner zone back into the reactor building or concrete tank, so that it can be stored there to let the radioactivity decay, or can be used for purposes of emergency cooling.

In nuclear reactor installations of the hill-type of construction, tunnels are provided which extend to the reactor building or concrete tank. In the invention of the instant application, the tunnels go through at least two mutually spaced liquid-tight partitions disposed inside the hill, and means are provided at the locations at which the tunnels pass through the partitions for closing off the tunnels. This makes it possible to ensure the desired activity-tight enclosure also, for example, in the case of military action, if the integrity of individual tunnel locks or sluices can no longer be relied upon.

In accordance with a further feature of the invention, the nuclear reactor installation includes another wall concentric with and spaced radially inwardly from the first-mentioned wall and defining therewith an annular zone, the other wall also defining an zone therewith, and a pump system disposed in one of the annular and inner zones and having a filter through which groundwater is pumped from the other of the annular and inner zones. It can thereby be possible to maintain the one zone as a region of lower activity. In this region, there can therefore be located, for example, the access means to the reactor building or concrete tank and, in addition, emergency and/or after cooling equipment can be accommodated there, which then remain accessible yet in the event of a disturbance even if other parts of the hill are already radioactive. It is important, in this regard, and in accordance with a concomitant feature of the invention, that the surface of the hill be formed with a stratum of clay, and covered by a stratum of mechanically strong material, such as pavement, and that the stratum of clay be joined to the wall in a liquid-tight manner in order to keep the activity in a predetermined and controllable area.

The instant application is one of three applications simultaneously filed by the applicant related generally to the same subject matter although directed to different inventions therein.

Other features which are considered as characteristic for the invention are set forth in the appended claims.

Although the invention is illustrated and described herein as embodied in nuclear reactor installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
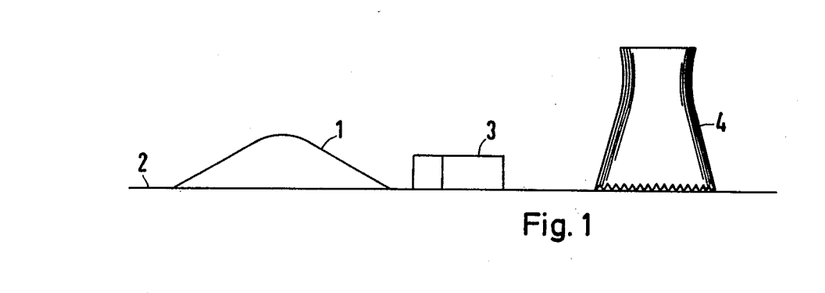
FIG. 1 is a diagrammatic elevational view of a nuclear reactor installation of the hill-construction type seen on the whole.

Referring now to the drawing and first, particularly, to FIG. 1 thereof, there is shown, on a very large scale of substantially 1:5000, a nuclear reactor installation disposed in a hill 1 which has been piled above the natural earth level 2 to a height of 55 m, for example, and encloses the activity-carrying parts. The nuclear reactor installation generates steam which is converted into electric energy. This occurs in a machinery building 3. The waste heat produced in the process is given off to the atmosphere in a cooling tower 4, which may also be a dry cooling tower.

Figure 2:
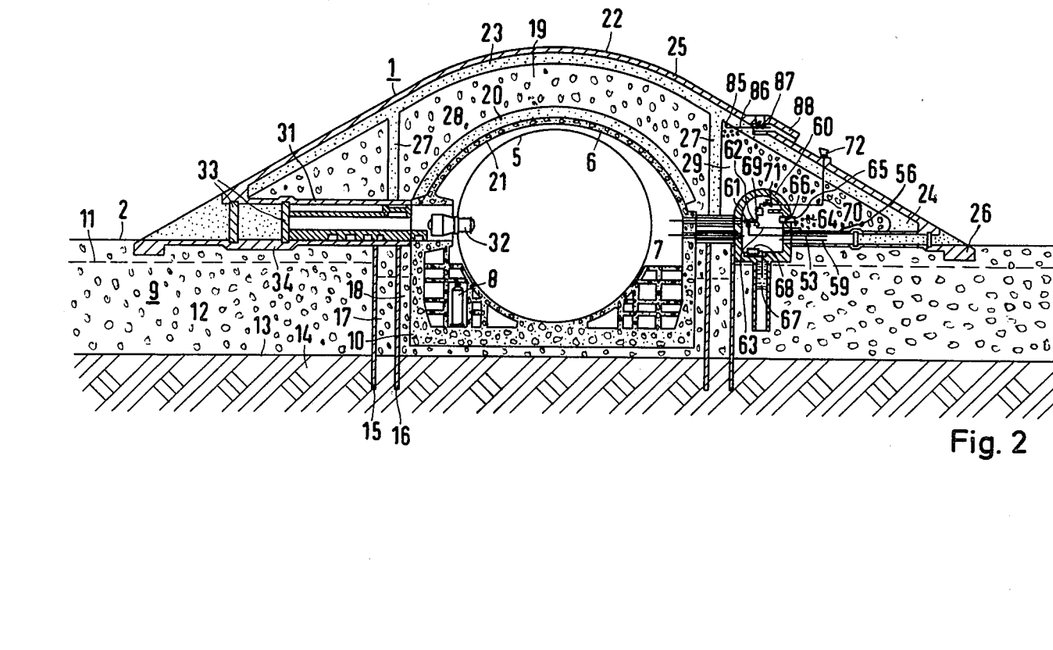
FIG. 2 and FIG. 3 are vertical sectional views of FIG. 4, on a scale approximately four times larger than that of FIG. 1, respectively taken along the lines II—II and III—III in the directions of the arrows.

The reactor installation includes a pressurized-water reactor for 1200 MWe, for example, which corresponds to about 3800 MW$_{th}$. The activity-carrying components thereof i.e. those of the primary circulatory loop, are enclosed in a containment 5 (FIG. 2) that is constructed as a steel sphere, as is known, for example, from a brochure of Kraftwerk Union Aktiengesellschaft entitled "Pressurized-Water Reactor" dated May 1975, order No. 295. The steel sphere 5, which forms a first tight enclosure, is in turn enclosed in a concrete tank 6 corresponding to a so-called secondary shielding in heretofore known installations, and is disposed as a central cell in the middle of the hill 1. The volume of the central cell is 210,000 m$^3$. The annular space 7 between the steel sphere 5 and the concrete tank 6 contains auxiliary and accessory equipment, as is indicated by a flood-water tank 8 (FIG. 2).

As is apparent, the concrete tank 6 is sunk into the earth 9 below the surface 2 thereof. The foundation 10 of the concrete tank 6 extends below the natural water table 11 into the water-permeable sand and gravel layer 12 of the earth 9. The water table 11 is determined by the upper side 13 of a water-impermeable marl stratum 14.

Into the earth 9, two annular or ring walls 15 and 16 are sunk, which concentrically or coaxially surround the concrete tank 6, that is constructed as a solid of revolution. The walls 15 and 16 extend, for example, evenly 10 m deep into the water-impermeable stratum 14 and extend above to the surface 2 of the earth 9, as shown especially in FIG. 3. The walls 15 and 16 are formed, for example, of a bentonite layer 0.6 m thick which can be considered to be water-impermeable.

The walls 15 and 16 mutually enclose therebetween an intermediate space 17, also referred to as an annular zone, and an inner space 18 wherein the concrete tank 6 is received. The inner space 18 is in communication with a water- and gas-permeable gravel volume 19 constituting the major part of the hill 1. From this part 19 of the hill 1, the concrete tank 6 is separated only by a clay layer or stratum 20, for example, 3 m thick, which is seated like a cap on an upper portion 21 of the concrete tank 6. The cap 20 ensures that even if cracks should appear in the concrete tank 6, gases or liquids cannot escape directly below the crest 22 of the hill 1, because they reach the lower portion of the hill 1 only below the edge of the cap 20, so that, before they can escape to the outside, they must pass through the entire volume of the hill 1 which serves as a filter.

A clay layer 23 is disposed on the gravel volume 19 and forms the upper portion of the hill; like the clay layer 20, the clay layer 23 may have a thickness of 3 or 4 m. The clay layer 23 extends over the entire surface of the hill 1 down to the edge 24 thereof, where the clay layer 23 meets the ground level 2. It forms a self-healing, gastight closure for the gas carrying volume of gravel 19. The mechanical integrity of the clay layer 23 is established by a 1 to 2 m thick concrete layer (shatter or crash layer) 25 which is anchored to the ground 9 by a foundation ring 26. The crash layer 25 may, in some cases, also be assembled or piled up of stones or individual concrete elements, because it is of primary importance that the crash layer 25 prevent any direct external effects upon the clay layer 23.

Figure 4:
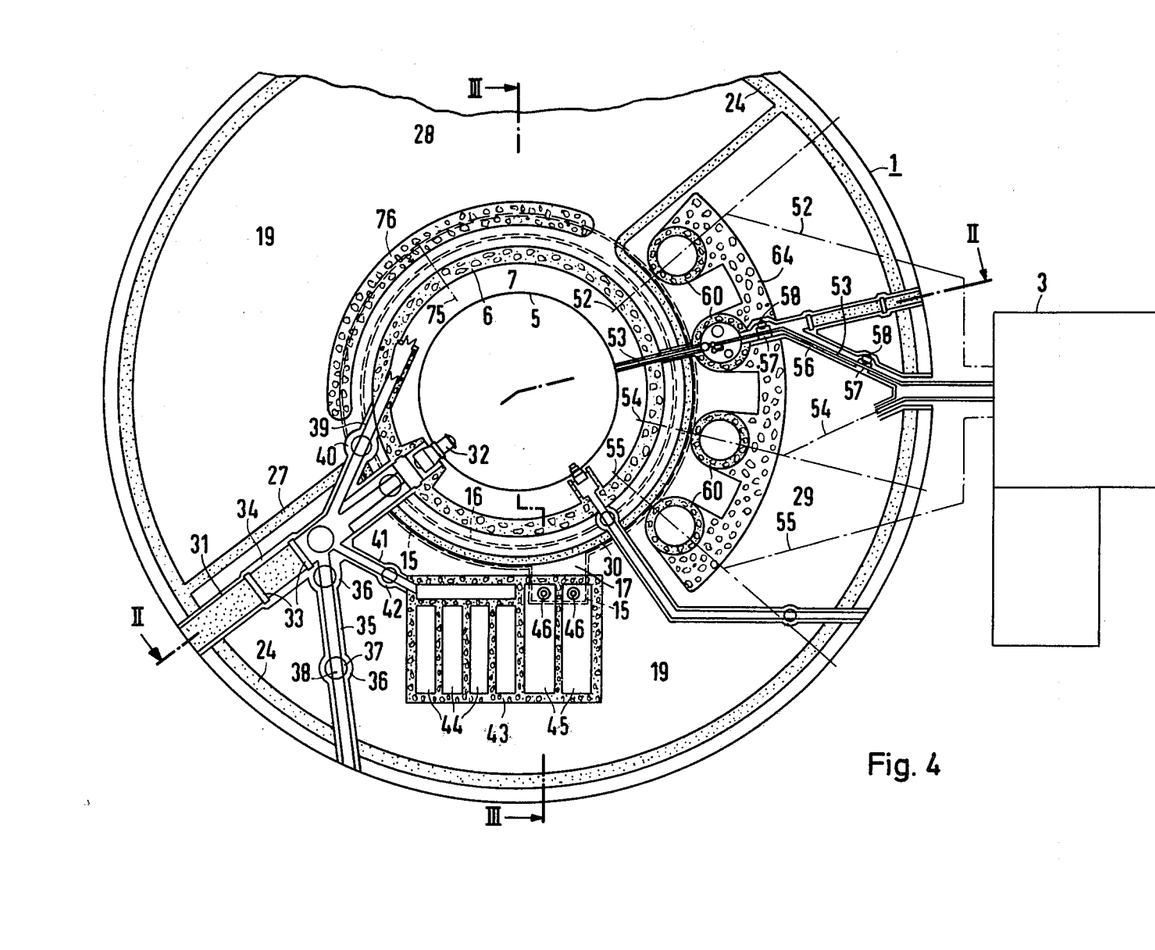
FIG. 4 is a horizontal sectional view of FIG. 2 taken along the line IV—IV in the direction of the arrows.

The horizontal sectional view of FIG. 4 shows that the gravel volume 19 in the hill 1 is divided into two zones 28 and 29 of different size by a 3 m thick vertical partition 27 formed of clay. The larger zone 28 surrounds the concrete tank 6, since the wall 27 extends around the concrete tank 6 in an arc 30 which, in the horizontal sectional view of FIG. 4, is disposed between the walls 15 and 16.

A smaller zone 29 contains all the accesses or approaches extending through the hill 1 to the concrete tank 6. Among them is a main tunnel 31, which ends at a material lock 32 leading into the containment sphere 5. The main tunnel 31 is needed only for the transportation of large components which is required for effecting repairs. It is therefore closed during normal operation be safety or lock bolts 33 formed of concrete, which are inserted into the concrete wall 34 of the main tunnel 31. The remaining space is filled with clay, as shown in FIGS. 2 and 4.

The main tunnel 31 is connected to the edge 24 of the hill 1 by means of a secondary tunnel 35 extending at an angle therefrom.

Shuts-off 36 are provided for the latter, which permit the tunnel 35 to be closed if required. The shut-offs 36 are formed of cylinders 37 having a through-opening 38, which can be closed by rotating the respective cylinder 37 through 90° from the position shown in FIG. 4. The main tunnel 31 is further adjoined by another secondary tunnel 39 leading into the annular space 7 between the containment sphere 5 and the concrete tank 6.

This secondary tunnel 39 also contains a shut-off 40 in the form of a rotatable cylinder having a through-bore like that of the cylinder 37.

Yet another secondary tunnel 41 is connected to the main tunnel 31 and leads through a shut-off 42 to an emergency building 43. The emergency building 43 is a strong concrete structure and contains, in bulkheaded individual chambers 44, emergency equipment required for emergency operation, such as emergency diesel units and emergency cooling equipment, for example, insofar as they are not located in the annular zone 7.

Figure 3:
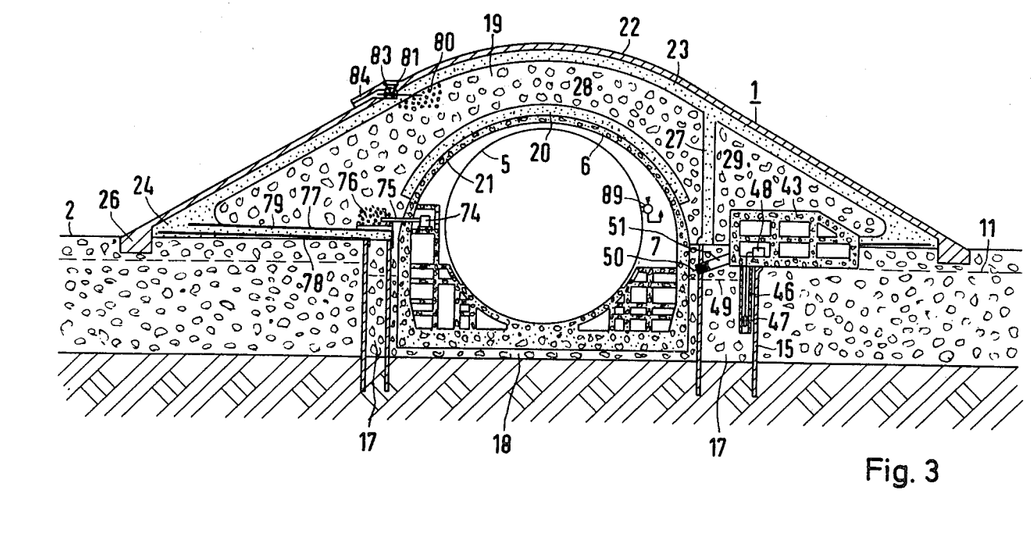

Respective pumping installations 47 with filter stations 48 are located in two additional chambers 45 of the emergency building, as is seen in detail in FIG. 3. Also, as shown in FIG. 4, these chambers 45 extend over the wall 15, which bulges out at this location. Therefore, the pumping installation 47, which is in the form of an immersion pump surrounded by a shaft 46 can draw ground water from the intermediate space 17 and force it into the space outside the wall 15 through the filter station 48. Thereby, a lower water table 49 is produced in the spaces 17 and 18. This "underpressure" or "negative pressure" prevents the likelihood of any possible radioactivity being washed or flushed with the ground water out of the region enclosed by the wall 15. The filter station 48, which may include wire filters, cellulose filters and activated-carbon filters, ensure the desired purity of the water pumped to the outside.

The filter station 48 can also be used if ground water is to be pumped through another line 50, which extends into the inner space 18 through an inclined shaft 51. Thus, ground water, which runs through the filter station 48, can be pumped from the inner space 18 into the part of the ground 9 located outside the wall 15. The line 50 can also serve to pump water from the annular space 17 into the inner space 18, should an overloading of the filter prevent the delivery of activity-free water to the outside. This could happen, however, only in the event of a completely unlikely serious accident if the reactor core should melt through the concrete tank 6.

In the illustrated embodiment of the invention, it is assumed that the primary circulatory loop of the pressurized-water reactor inside the containment sphere 5 includes four steam generators. From the latter, four steam lines 52, 53, 54 and 55 extend as can be seen in FIG. 4. They are constructed, at least in the annular zone 7, as double lines and lead through separate tunnels 56 from the concrete tank 6 to the machinery building 3. These tunnels 56 are formed of concrete tubes which float in the ground 9 and are flexibly connected through elastic seals. They are assembled at angles to one another in order to prevent direct action from the outside on the concrete tank 6. In addition, in the vicinity of baffle plates 57, which also serve for bracing and fixing the steam lines 52 to 55, smaller shutoffs 58 are provided, by which the part of the tunnels 56 which is accessible for inspecting the lines 52 to 55 can be shut off. Parallel to the main or live steam lines 52 to 55, feedwater lines 59 extend through the tunnels 56, as is indicated in FIG. 2.

The tunnels 56 for the connecting lines 52 to 55 and 59, as well as the main tunnel 31 and the secondary tunnels 35, 39 and 41, run exclusively through the zone 29. Along the length of each of the tunnels 56, a respective concrete cell 60 is located at the end thereof facing the concrete tank 6, directly at the partition 27. The four concrete cells 60 are constructed and equipped in a similar manner. They are pressure-proof structures of shell-type or monococque construction in the form of vertical cylinders with a hemispherical roof or ceiling, which are designed for an internal pressure of 15 bar. The cells 60 have volumes of 1,700 m$^3$, respectively, which is only 1/120 the volume of the concrete tank 6. The concrete cells 60 and the tunnels 56 are located above the ground water level or table 11, so that the elastically sealed connecting openings also remain free of ground water. Simultaneously, by means of conical fastening locations of the pressure lines 52 to 55 and 59, which are constructed as doublewalled lines, pressure-tight bulkheading in the vicinity of the concrete cells 60 is assured.

The concrete cells 60, as auxiliary cells, separate from the concrete tank 6, contain the valves which are necessary for the operation of the installation and which are mounted predominantly at the aforementioned fastening locations as described in copending application Ser. No. 700,910, filed June 29, 1976 of which applicant is a coinventor. Among the valves in the concrete cells 60 is a shut-off valve 61 constructed as a corner valve in the train of the steam lines 52 to 55, to which a safety valve 62 is connected. From the safety valve 62, a relief line 63 extends out of the auxiliary cell 60 to a gravel bed 64 which extends along one side of the zone 29, as can be seen in FIG. 4, and is connected to each of the auxiliary cells 60. Additional discharge or outlet openings formed in pipes 65 and having a cross section of 5 m$^2$, extend into the gravel bed 64, the outlet openings being closed off by diaphragms 66. Relief is thereby assured, for example, in the event of a break in the 70-bar main steam line in the auxiliary cell 60, to an extent that the permissible internal pressure in the cell 60 is not exceeded. Through the line 63, activity-carrying steam from the safety valve 62 can also be discharged for relieving pressure in the event of an accident.

A deep well 67 is associated in the same manner with each of the auxiliary cells 60. Activity-free ground water can be drawn from the deep wells 67 by means of a pump 68 and fed to a so-called tertiary evaporator 69. Live steam (secondary steam) from the lines 52 to 55 can be fed to the tertiary evaporators 69. Therefore, heat can be removed by the tertiary evaporators 69, should the normal heat sink of the turbines and the after-cooling or recooling system of the nuclear reactor installation also fail. Since this heat removal by the tertiary evaporators is separated from the secondary circulatory loop of the nuclear reactor, the steam can be given off directly to the outside through a relief or discharge line 70 with a shut-off valve 71, and also with a sound absorber 72 located on the surface of the hill, since no activity can be discharged therewith. For the shock-like or pulsating elimination of small amounts of heat through the safety valve 62, a blow-down or relief tank filled partly with water, in conventional manner, and set up for condensing the steam, can be disposed in each of the auxiliary cells 60.

A valve system 74 is associated with the annular space 7 between the safety containment sphere 5 and the concrete tank 6, and is connected to relief lines 75. The valve system 74 is supposed to ensure that the concrete tank 6 will not blow up even if, in the case of an accident, steam should escape from the containment sphere 5 and thereby pose the threat that the pressure strength of the concrete tank might be exceeded. This strength is especially defined by the bearing pressure of the materials forming the hill 1. For example, a pile 20 m high with a specific gravity of 2 tons/m$^3$ produces an outer excess pressure of about 4 bar upon the concrete tank 6. This pressure relieves the dome or vault-like concrete shell of tensile stress as long as the internal excess pressure of overpressure does not reach a higher value. The valve system 74 encompasses preferably one or more safety valves with a relatively low response overpressure of, for example, 1 bar and a small relief cross section. The small quantities of air and steam, such as are anticipated in the initial phase of the hypothetical failure of the containment sphere 5 can thereby be discharged. In addition, however, additional safety valves with large relief cross section and responsive to a higher pressure are provided.

With this possible system of pressure relief or exhaust which has, for example, twice the cross section, rupture of the concrete tank 6 can be prevented also if, due to intense heating resulting from a possible core meltdown, large amounts of steam are abruptly generated due to a sudden inrush of the water volume, for example, coming perhaps, from the fuel-element pit and exceeding the storage capacity of the concrete tank 6.

The relief or exhaust lines 75 lead to a large gravel bed 76 in the zone 28. From there, the steam can be distributed in the volume of gravel 19 of the hill 1. This ensures filtering and condensation of the steam, so that no radioactive parts can penetrate directly to the ambient environment. Due to the provision of two gastight sheets 77 and 78 of plastic material extending virtually parallel to each other, assurance is provided also that the radioactivity cannot be rinsed into the free ground water by water which is produced, for example, as condensate. The sheets 77 and 78 of plastic material, on the contrary, with the slightly conical disposition thereof, form runoff surfaces, by which such water is normally conducted into the inner region 18 of the wall 16. In the event that the sheet 77 of plastic material, which lies on a lower clay layer 79, should be damaged, the lower sheet 78 of plastic material disposed in the clay layer 79 ensures that leakage water or rain water can flow out of the region 19 only into the intermediate space 17.

In the upper region of the gravel volume 19 i.e. below the clay layer 23, passageways or outlets may be provided such as are shown in FIGS. 2 and 3. For this purpose, a semicircular bed 80 of coarse gravel is provided which forms a collecting space in the zone 28. At that location, there starts a line 81 with a shut-off valve 82 leading to the outside through the clay layer 23 and the crash layer 25, the shut-off valve 82 being manually actuatable by means of a spindle 83. The outlet of the line 81 is covered by a hood 84, which serves as protection from rain water. The hood 84 simultaneously provides mechanical protection for the line 81, however. The zone 29 can likewise be provided with a gravel bed 85, which is located at the highest point of this zone 29 and forms a collecting space thereat for the outlet line 86 which has a valve 87 and a covering hood 88.

The discharge lines 81 and 86, only a single one of which may also be provided, permit relief of pressure applied to the hill 1 by air that might be displaced in the event of an accident, thereby preventing the clay layer 23 from breaking open. The valves 82 and 87 can, for example, be subject to pressure-dependent control, in that they are opened at overpressures or excess pressures greater than 0.5 bar and at underpressures greater than 0.2 bar. However, they may, in addition, be subject to activity-dependent actuation, by which closure is effected independently of the pressure, should this escaping medium be radioactive.

Figure 5:
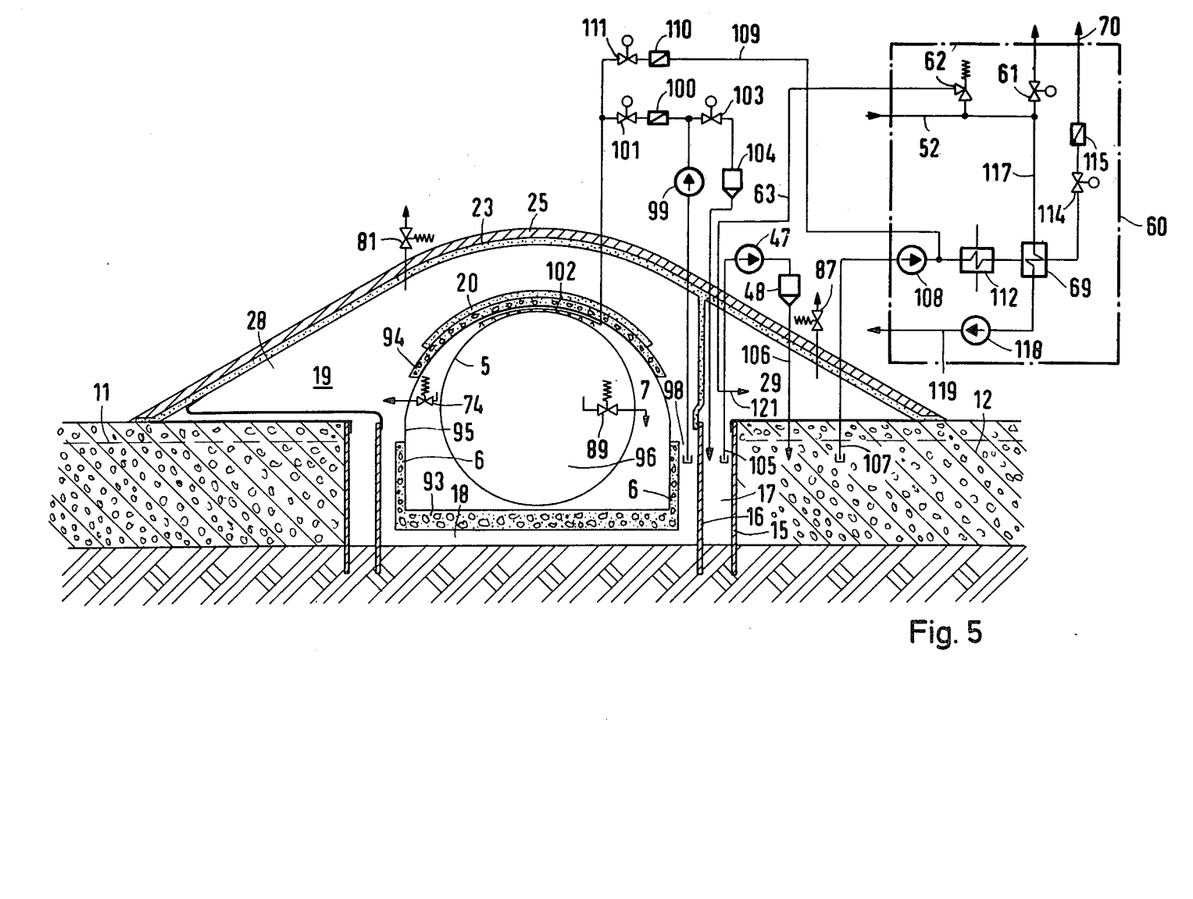
FIG. 5 is a schematic diagram of the layout of various lines for cooling, ventilating, and otherwise servicing the reactor superimposed upon a simplified vertical sectional view somewhat similar to that of FIG. 2.

In FIG. 5, there is shown diagrammatically, a safety valve 89 which relieves the containment 5, for example, in the event of an overpressure of 5 bar, by discharging into the concrete tank 6. This safety valve 89 is supposed to prevent the pressure in the containment 5 from increasing beyond design pressure (6 bar) if the emergency cooling should fail and a break in a pressure-carrying line in the containment 5 should simultaneously occur. The energy content of the containment 5 is limited to a value which can also be absorbed by the concrete tank 6 (4 bar) upon sudden failure of the containment 5. The line cross section of the valves of the valve system 74, which are designed for a low response pressure, can therefore be throttled greatly, for example, to four openings with 20 cm diameter, since only the residual heat of the reactor, which has already been shut down for some time, must be released. This permits a steady condensation of the steam in the gravel volume 19 and only a moderately heavy production of exhaust air in the line 81, so that the cross section of the latter can also remain small (4×20 cm).

In the schematic view of FIG. 5, the concrete tank 6 is shown with varying wall thicknesses. This is to indicate that it is formed, in the lower part thereof, of a mechanically sturdy tray 93 and in the upper part thereof, of a likewise mechanically sturdy cap 94. In the middle region 95 thereof, however, a given amount of permeability in the event of overloads or excess pressure may be provided or may occur. The concrete cap 94 is formed of a heat-resistant grade of concrete and supports the clay layer 20.

As is apparent, the interior 96 of the spherical containment shell 5 is connected by means of safety valves 89 to the annular space 7 between the containment sphere 5 and the concrete tank 6. The response value of the safety valves 89 should, in fact, be as high as possible, but should ensure, on the other hand, that the containment sphere 5 can never be ruptured suddenly when the pressure increases, because relief through the safety valves 89 will have taken place first.

The annular space 7, on the other hand, is connected in the region 95 of the concrete tank 6 to the so-called high-activity zone 28 of the gravel volume 19 through the valve system 74. The valves 74 have, for example, an overpressure response of 4 bar. The zone 28 is again connected to the atmosphere above the hill 1 through valves 81 which are openable in dependence upon pressure and have an overpressure or excess pressure response of 0.5 bar. This is to prevent the hill 1 from being broken open in the region of the clay layer 23 serving as a sealing skin, so that gases or vapors escape in concentrated form. For a greater weight of the clay layer 23 and/or the crash layer 25 covering it, a correspondingly higher response value of the safety valves 82 can also be chosen.

In the interior space 18 within the inner wall 16, a well 98 is provided, from which a pump 99 can draw water. The pump operates only in the case of accidents which threaten the containment sphere 5 and the concrete tank 5. The water is pumped through a check valve 100 and a control valve 101 to a spraying device 102, which can cool the upper part of the containment 5, so that a lowering of the pressure in the containment 5 can be attained. The pump 99 can furthermore be delivered through a control valve 103 and a filter 104 into the space 17 between the two walls 15 and 16. In the space 17, the well 105 with the immersion pump 47 is provided, which pumps ground and leakage water through the filter station 48 into the region outside the wall 15 of the ground-water bearing layer 12, as indicated by the line 106.

Another well 107, which is installed redundantly fourfold and is designed, for example, for 4×150 m³/h, serves to feed a pump 108. The latter can supply the spraying device 102 through a line 109 with a check valve 110 and a control valve 111. The pump 108 further supplied coolers or intermediate heat exchangers 112, which are required, for example, for cooling emergency-power diesel sets. The water coming from the cooler 112 can also be fed, if required, to the tertiary evaporator 69, with which the energy of the nuclear reactor installation is utilized for the generation of steam in the event the normal heat sinks fail as described in copending application Ser. No. 746,176, filed Nov. 30, 1976, of which applicant is a coinventor. The steam then generated can be conducted to the relief or discharge 70 through a control valve 114 and a check valve 115.

The tertiary evaporator 69 is connected through a line 117 to the live steam line 52, which, in the normal case, leads to the turbine through the shut-off valve 61. The safety valve 62 at the live steam line 52 allows steam to be blown off into the so-called low-activity zone 29 of the gravel volume 19, as indicated by the line 63 and the outlet 121 thereof. The air normally present in the soil can then be blown off through the excess pressure valve 87, if the excess pressure exceeds 0.5 bar when the steam is introduced.

The pump 108 for both the cooler 112 and the tertiary evaporator 69 together with the shut-off device 61 of the live steam line 52 and the safety valve 62 connected thereto, is housed in the auxiliary cell 60, indicated diagrammatically in FIG. 5 by the box shown in dot-dash lines, which is situated in the ground of the hill 1, as shown in FIGS. 2 to 4. This auxiliary cell 60 also contains another pump 118, with which the condensate (feed-water) present in the tertiary evaporator 69 is returned to the steam generator through a line 119.

In the illustrated embodiment, it is shown that the safety valve 89 of the containment sphere 5 leads into the annular space 7, from which additional safety valves of the valve system 74 afford pressure relief. A direct relief line from the containment sphere 5 into the "high-activity" zone 29 of the gravel volume 19 may also be provided, however, so that pressure relief can be effected for the containment 5 without adversely affecting the accessibility of the annular space 7.

I claim:

1. Nuclear reactor installation having a tight concrete tank sunk at least in part into earth formed with a groundwater-permeable layer and a largely impermeable layer providing a lower boundary for the groundwater-permeable layer, comprising a ring wall disposed in the earth and surrounding the concrete tank, said wall extending down through the groundwater-permeable layer at least to the impermeable layer, means for connecting groundwater in the part of the groundwater-permeable layer enclosed by said wall with groundwater in the part of the groundwater-permeable layer located outside said wall, said connecting means including a pump for maintaining a negative pressure in the groundwater in the permeable layer part enclosed by said wall and a filter for separating activity carriers from the groundwater in the permeable layer part enclosed by said wall, and a hill of fill-earth directly covering the top of the concrete tank, said hill being formed of strata of material of varying permeability including an impermeable stratum forming an outer surface of said hill and extending beyond said wall.

2. Nuclear reactor installation according to claim 1 including another wall concentric with and spaced from said first-mentioned wall and defining therewith an annular space to which said pump is connected.

3. Nuclear reactor installation according to claim 1 wherein said hill rises above a given ground level and extends laterally beyond said wall.

4. Nuclear reactor installation according to claim 3 wherein said wall within said hill extends up to said given ground level.

5. Nuclear reactor installation according to claim 3 wherein said hill is in the shape of a bell enclosing the concrete tank.

6. Nuclear reactor installation according to claim 5 wherein said strata are bounded by sheets of plastic material.

7. Nuclear reactor installation according to claim 1 wherein said wall is formed of bentonite.

8. Nuclear reactor installation according to claim 3 including partitions formed of clay subdividing the interior of the hill into at least two zones.

9. Nuclear reactor installation according to claim 8 including another wall concentric with and spaced radially inwardly from said first-mentioned wall and defining therewith an annular zone to which said pump is connected, said other wall also defining an inner zone therewithin, each of said two zones subdivided by said clay partitions being connected with said annular and said inner zone, respectively.

10. Nuclear reactor installation according to claim 9 including pump means for pumping leakage and rain water out of said inner zone and into said concrete tank.

11. Nuclear reactor installation according to claim 1 including tunnels extending from outside said hill to the concrete tank, said tunnels passing through at least two mutually spaced liquid-tight partitions disposed inside said hill, and means at the locations at which said tunnels pass through said partitions for closing off said tunnels.

12. Nuclear reactor installation according to claim 1 including another wall concentric with and spaced radially inwardly from said first-mentioned wall and defining therewith an annular zone, said other wall also defining an inner zone therewithin, and a pump system disposed in one of said annular and inner zones and having a filter through which groundwater is pumped from the other of said annular and inner zones.

13. Nuclear reactor installation according to claim 1 wherein said outer surface stratum is formed of clay and is covered by a stratum of mechanically strong material.

14. Nuclear reactor installation according to claim 13 wherein said stratum of mechanically strong material is a pavement.

* * * * *